Dec. 17, 1963 F. ALBERT 3,114,586

SOCKET CONTACT FOR PRINTED CIRCUITS AND THE LIKE

Filed Feb. 6, 1961

United States Patent Office
3,114,586
Patented Dec. 17, 1963

3,114,586
SOCKET CONTACT FOR PRINTED CIRCUITS AND THE LIKE

Felix Albert, Pocking, Upper Bavaria, Germany, assignor to Siemens & Halske Aktiengesellschaft Berlin and Munich, a corporation of Germany Filed Feb. 6, 1961, Ser. No. 87,186
Claims priority, application Germany Mar. 8, 1960
1 Claim. (Cl. 339—17)

This invention is concerned with a device for disposing elements such as relays, tubes and the like, having socket means carrying contact pins, in removable and exchangeable plug-in assembly with printed, etched or otherwise constructed circuits provided upon an insulating support or carrier made, for example, in the form of a plate.

There are plug-in connections known, for the above indicated purpose, in which the contact pins which normally extend rectilinearly from the socket of an element to be plugged in, for example, a relay, are arranged so that the terminal ends thereof are disposed according to the division of the pattern which is customary in the case of printed or like circuits. However, such an arrangement results in some cases in a considerable increase of the total height of the structure comprising the insulating support or carrier for the circuit and the electrical devices disposed thereon, and the latter have therefore been mounted in some instances with the contact pins thereof inserted into holes formed in the insulating carrier and conductively connected with the printed conductors by soldering. The benefits of removability and exchangeability of the electrical devices are thereby lost.

The object of the present invention is to provide a device for effecting the electrical connections between printed and like circuits and electrical units cooperating therewith, for example, relays or tubes, while retaining the benefits of easy exchangeability thereof and avoiding unnecessary increase of the structural height of the resulting network.

According to the invention, this object is realized by forming holes in the insulating carrier according to the pattern of the contact pins extending from the sockets of the respective electrical devices to be connected, and providing in such holes inserts which are suitable means mechanically connected with the insulating carrier while being electrically connected with the circuit conductors disposed thereon.

The various objects and features of the invention will appear from the description which is rendered below with reference to the accompanying drawings showing in schematic manner embodiments thereof.

FIG. 1 shows an insulating carrier provided with a printed circuit and two electrical devices, one of which is in plugged-in position while the other is ready for being plugged in.

FIG. 2 is a partial sectional view through an insulating carrier with a hole formed therein in which is disposed a contact insert made of a leaf spring bent upon itself.

Figures 1, 2:
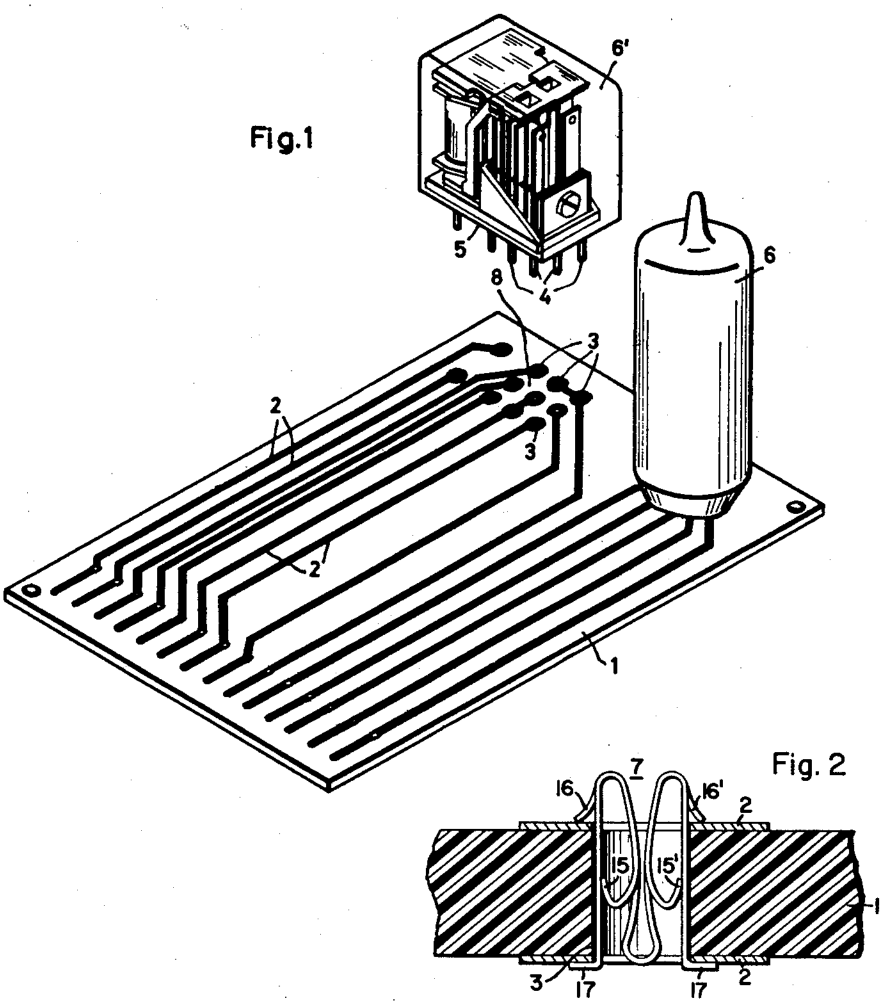

In FIG. 1, numeral 1 indicates an insulating carrier having circuit conductors 2 printed, etched or otherwise provided thereon on one or if desired on both sides thereof. Holes 3 are formed in the insulating carrier 1 in a pattern corresponding to that of the contact pins 4 extending from the socket 5 of the electrical unit, for example, a relay 6' which is to be plugged in. The circuit conductors 2 extend to the respective holes 3, each hole containing a contact insert to be presently described. These contact inserts have been omitted in FIG. 1 which merely shows the relay 6' in preparatory plug-in position with respect to its socket portion 8 on the plate 1. Similar holes, likewise provided with contact inserts, are formed in the insulating carrier 1 for receiving the contact pins extending from another electrical device, for example, a tube 6 which is shown in plugged-in position.

The contact inserts 7 are introduced into the holes 3 in the insulating carrier and are mechanically connected therewith, for example, by riveting and the like and are electrically connected with the corresponding individual circuit conductors 2, for example, by immersion soldering. Desired parts of the contact inserts can be protected against the solder by varnish or the like.

Figure 3:
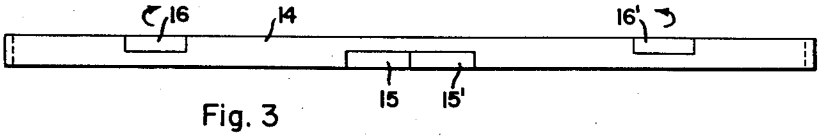
FIG. 3 indicates the form of the blank of the leaf spring for the contact insert illustrated in FIG. 2.

The contact insert 7, as illustrated in FIG. 2, is made of a blank (FIG. 3) formed of a metal strip 14 of a length corresponding to about five times the thickness of the insulating carrier and a width corresponding to about ⅓ of the hole diameter, provided with ears 15, 15', 16, 16' which are bent therefrom to form the similarly referenced parts in FIG. 2. The ears 15, 15' back the resulting contact insert 7' resiliently against the inner wall of the hole 3, while the spreading ears 16, 16' hold the insert in the hole 3 in cooperation with the flanges 17 bent therefrom at the other end thereof. The blank 14 is first bent about the center thereof and at about ¼ of its length spaced from the ends thereof, thus forming an approximately M-shaped structure which is inserted into the hole 3 and mechanically fastened in position by the ears 16, 16' and 17, the electrical connection with the respectively associated circuit conductors 2 being effected by soldering as already described.

Changes may be made within the scope and spirit of the appended claim which define what is believed to be new and desired to have protected by Letters Patent.

I claim:

A socket device for contact pins extending from electrical devices such as tubes and relays and the like which are to be removably mounted upon an insulating carrier provided with circuit conductors formed by a printed circuit or the like, said insulating carrier having holes formed therein which are arranged in a pattern corresponding in the pattern of the contact pins of the electrical device to be mounted thereon, each hole cooperatively associated with at least one of said circuit conductors, comprising contact means inserted into the respective holes in said insulating carrier and formed from a leaf spring blank of a width corresponding to approximately one-third of the inner diameter of said hole, said blank being bent three times transverse to the longitudinal extent thereof to form a member having four approximately parallel portions of substantially equal length which is inserted into said hole of the insulating carrier, opposite ends of said member forming flange-like extensions for contact engagement with a circuit conductor at one side of said insulating carrier, ears being formed from said member at the other end thereof for contact engagement with a circuit conductor at the other side of said insulating carrier, and ears formed from the inner legs of said member extending arcuately therefrom into resilient and sliding backing engagement with the outer legs thereof.

References Cited in the file of this patent

UNITED STATES PATENTS

| | | |
|---|---|---|
| 1,906,469 | Knutson | May 2, 1933 |
| 2,613,252 | Heibel | Oct. 7, 1952 |
| 2,870,424 | Franz | Jan. 20, 1959 |
| 2,909,756 | Sitz | Oct. 20, 1959 |
| 2,913,634 | Scoville | Nov. 17, 1959 |
| 2,969,517 | Gluck | Jan. 24, 1961 |